Patented Jan. 19, 1932

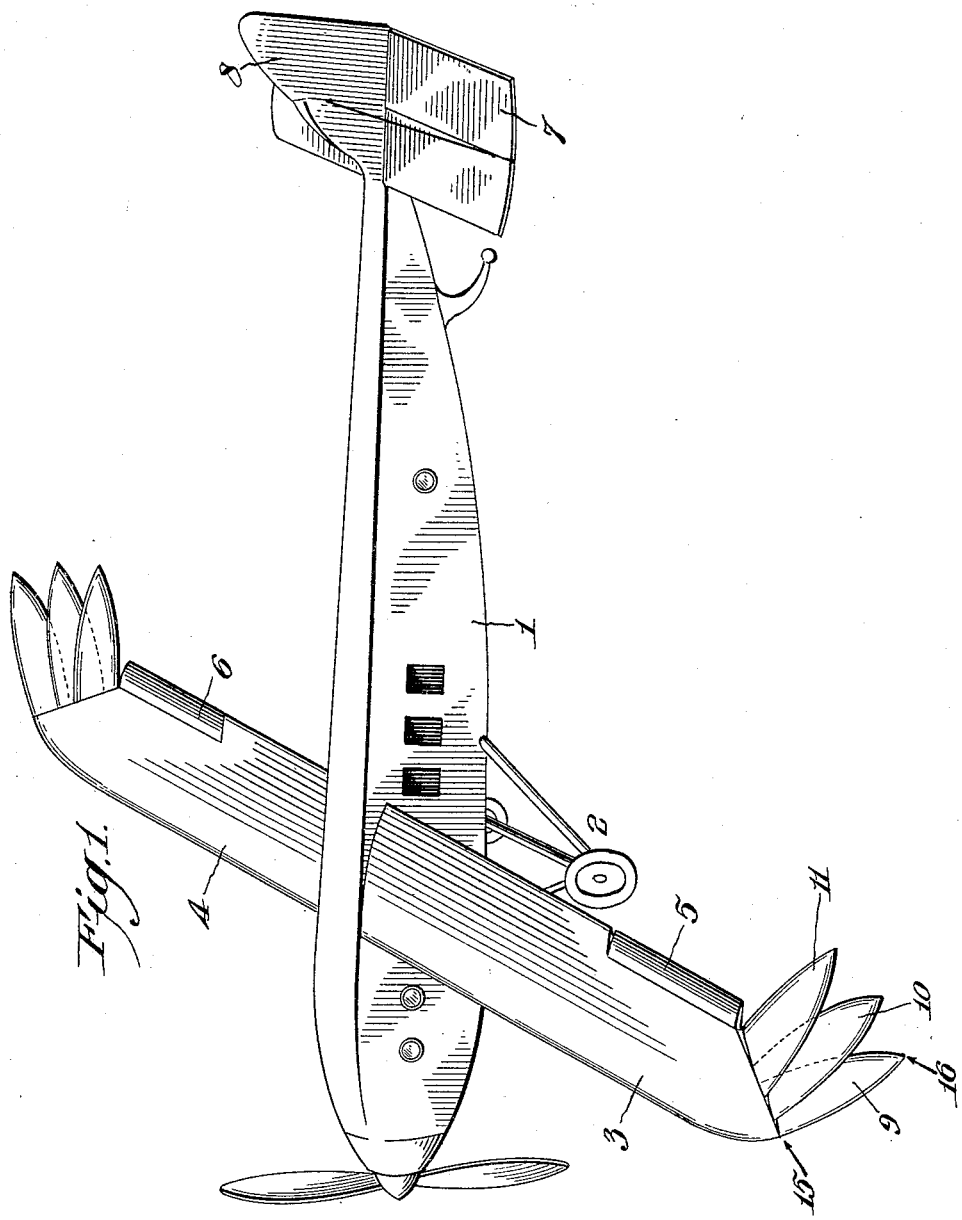

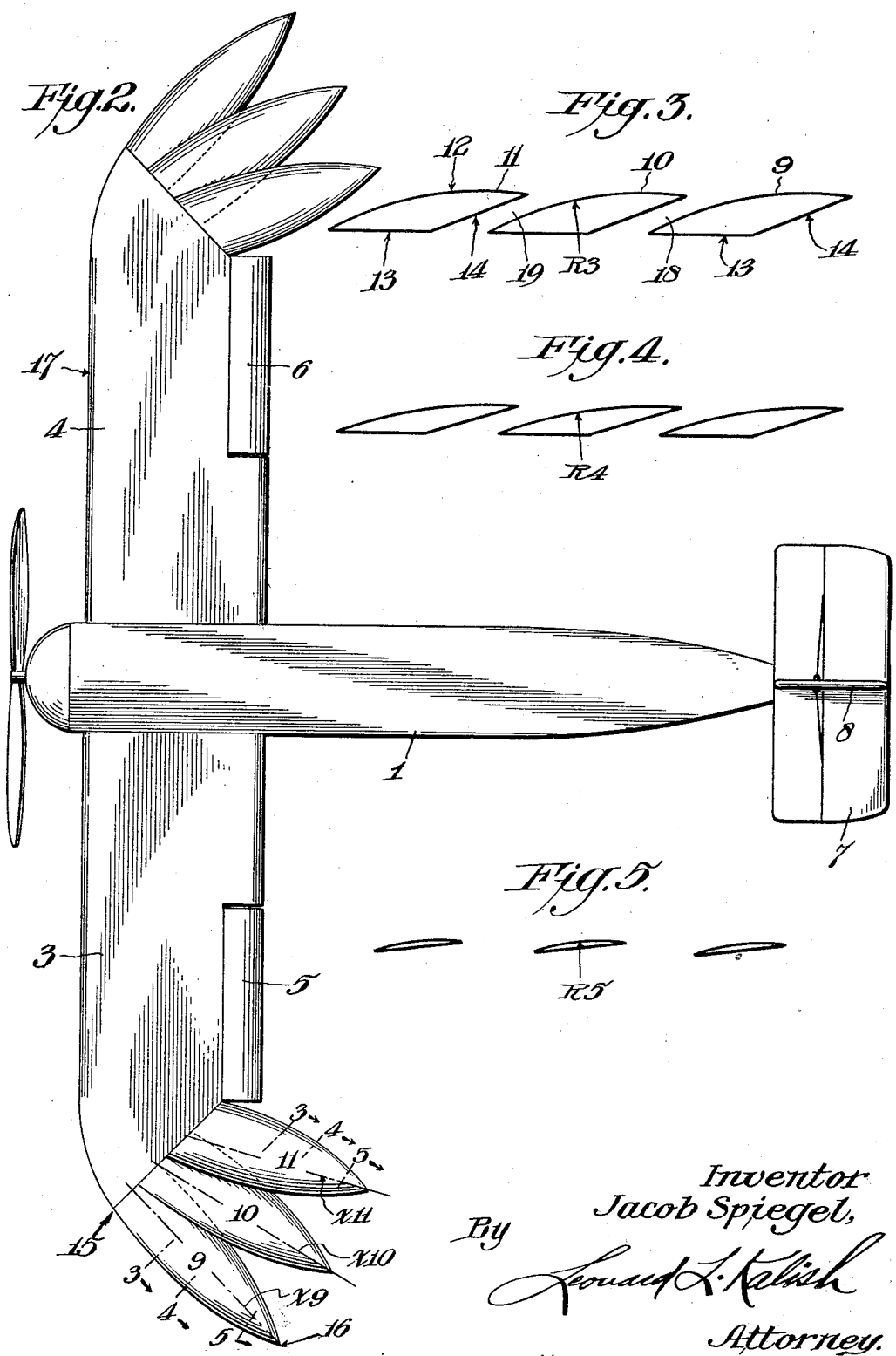

1,841,921

UNITED STATES PATENT OFFICE

JACOB SPIEGEL, OF PHILADELPHIA, PENNSYLVANIA

AIRPLANE CONSTRUCTION

Application filed December 4, 1929. Serial No. 411,403.

My invention relates to a new and useful construction in aircraft, particularly of the heavier-than-air type, and it relates more particularly to a novel wing construction whereby the natural equilibrium and stability of the machine are greatly increased.

My invention further relates to a novel wing construction, including certain novel type of feather-like wing portions, arranged upon and projecting from the outer ends of the wings which are of such construction and are arranged in such a way as to impart a natural stability to the wings and the aircraft as a whole.

The object of my invention is to provide a number of smaller auxiliary air surfaces at each of the tips of the main wings, in peculiarly assembled relation to each other, which will so react upon the air streams as to maintain a lateral stability of the plane at lower speeds than is at present possible, and to permit slower horizontal gliding and landing speeds.

With the above ends in view, I provide at each of the outer tips of the main wing, a series of elongated, feather-like, auxiliary air surfaces, extending outwardly and rearwardly at an angle and being disposed as to produce the maximum lift on these auxiliary air surfaces, in a transverse air stream, without offering any undue resistance in normal straight-away flight, so that greater stability and lower gliding and landing speeds may be attained without sacrificing any of the normal navigability and straight-away flight speed of the air craft.

For the purpose of illustrating my invention I have shown in the accompanying drawings forms thereof which are at present preferred by me, since the same have been found in practice to give satisfactory and reliable results, although it is to be understood that the various instrumentalities of which my invention consists can be variously arranged and organized and that my invention is not limited to the precise arrangement and organizataion of the instrumentalities as herein shown and described.

Referring to the drawings in which like reference characters indicate like parts:—

Figure 1 represents a perspective view of an aircraft embodying my invention.

Figure 2 represents a top plan view of the same.

Figure 3 represents a section on line 3—3 of Figure 2, on a greatly enlarged scale.

Figure 4 represents a section on line 4—4 of Figure 2, on a similarly enlarged scale.

Figure 5 represents a section on line 5—5 of Figure 2, on a similarly enlarged scale.

In carrying out my invention I may provide any conventional fuselage 1, having any suitable landing gear 2, wings 3 and 4, ailerons 5 and 6, and the tail control surfaces 7 and 8, also of any suitable construction.

Upon each of the extremities of the wings 3 and 4 I provide a plurality of feather-like, auxiliary air surfaces of a particular construction. In the particular illustration of my invention, the auxiliary air surfaces or auxiliary wing members are three in number on each of the main wings 3 and 4, and are designated by the numerals 9, 10, and 11, respectively.

Each of the auxiliary or stabilizing air surfaces or auxiliary wing members 9, 10 and 11 is provided with a curved upper surface 12, and a lower surface formed of two planes intersecting each other at an obtuse angle. These two lower plane surfaces are designated by the numerals 13 and 14.

The auxiliary wing members 9, 10 and 11 taper from their base portions 15, to substantially a point at their free ends 16. The radius of curvature of the upper surface 12 of the auxiliary wing members 9, 10 and 11, gradually increases from the base 15 to the tip 16 of said auxiliary wing members, while the angle between the two lower plane surfaces 13 and 14 gradually increases from the base 15 to the tip 16, with the result that the curvature of the upper surface of said auxiliary wing members gradually decreases towards the tip, while the lower surface gradually flattens out into a plane, as will be seen in the successive Figures 3, 4 and 5, in which the radii are designated successively as R—3, R—4 and R—5.

The successive series of auxiliary wing members 9, 10 and 11 are affixed to the ends of the main wings 3 and 4 in any suitable manner, or they may be built integrally with said main wings, as may be desirable. In either event the first auxiliary wing member 9 is arranged with its central axis X—9 at an angle of approximately 45° to the leading edge 17 of the main wings 3 and 4, and with its lower surface 13 arranged substantially parallel or flush with the lower surface of the main wings 3 and 4.

The next adjacent auxiliary wing member 10 is arranged with its axis X—10 at approximately an angle of 15° to the axis X—9 of the auxiliary wing member 9, and with its base portion 15 overlapping the auxiliary wing member 9 in a manner indicated in section in Figure 3.

The third auxiliary wing member 11 is in turn arranged with its axis or median line X—11 at an angle of approximately 15° to the axis or median line X—10 of the adjacent auxiliary wing member 10, and likewise overlapping or overhanging said auxiliary wing member 10 in a manner indicated in Figure 3.

The successive auxiliary wing members 9, 10 and 11 are thus arranged so as to overlap each other at their base portions and to diverge towards their outer extremities. The under-surfaces 14 of the auxiliary wing member 10 and 11 overlap the rear or trailing edge portions of the upper curved surfaces 12 of the auxiliary wing members 9 and 10, respectively, to a suitable extent, as indicated in Figure 3.

The adjacent auxiliary wing members 9, 10 and 11 are spaced from each other at their overlapping portions, as at 18 and 19, to an extent sufficient to permit the free passage of air following each of the upper curved surfaces 12 of the auxiliary wing members 9, 10 and 11, so as to produce a substantially uninterrupted downwash from each of said auxiliary wing members.

By my novel construction I thus produce a greatly increased lift at the tip of each of the wings 3 and 4, and a resultant lateral stability which renders possible relatively lower landing and gliding speeds with safety and which at the same time greatly increases the safety factor of the plane while in flight, because of the increased lateral stability.

By my novel construction also the normal operation and navigability of the airplane is not impeded.

It will be apparent that I have devised a novel and useful construction in aircrafts, which embodies the principles and features of advantage enumerated as desirable in the statement of the invention and the above description, and while I have in the present instance, shown and described preferred embodiments thereof, which will give in practice satisfactory and reliable results, it is to be understood that the various details of construction are susceptible of modification in various particulars without departing from the spirit or scope of the invention or without sacrificing its salient characteristics and advantages.

Having thus described my invention, what I claim as new and desire to secure by Letters Patent, is:

1. In an aircraft having juxtaposed wings, a plurality of auxiliary wing members projecting from the extremities of each of the main wings, inclined at an angle to the leading edge of said main wings and also inclined with respect to each other and overlapping each other successively at their base portions; said auxiliary wing members being tapered towards their free ends and having an upper curved surface, the radius of curvature of which increases towards the free end and having the lower surfaces formed of two planes intersecting each other at an obtuse angle increasing towards the outer extremities of said auxiliary wing members.

2. In an aircraft having juxtaposed wings, a plurality of auxiliary wing members projecting rigidly from the extremities of each of the main wings, inclined at an angle to the leading edge of said main wings and also inclined with respect to each other and overlapping each other successively at their base portions; said auxiliary wing members being tapered towards their free ends and having an upper curved surface, the radius of curvature of which increases towards the free end and having the lower surfaces formed of two planes intersecting each other at an obtuse angle increasing towards the outer extremities of said auxiliary wing members.

3. In an aircraft having juxtaposed main wings, a plurality of auxiliary wing members projecting rigidly from the extremities of said main wings; said plurality of auxiliary wing members overlapping each other successively at their base portions, with the leading edge of each auxiliary wing member being disposed above and in suitably spaced relation to the trailing edge portion of the adjacent auxiliary wing member in advance thereof, and the free ends of said auxiliary wing members being in non-overlapping relation to each other; said auxiliary wing members having an upper curved surface and having their lower surfaces formed of two planes intersecting each other at an obtuse angle.

4. In an aircraft having juxtaposed main wings, a plurality of auxiliary wing members secured to the extremities of each of said main wings and projecting therefrom, said auxiliary wing members being tapered towards their free ends, and having their base portions in overlapping relation to each other, with the leading edge of each auxiliary wing member overlapping the trailing edge of the adjacent auxiliary wing member and being in spaced relation thereto and the free ends of said auxiliary wing members being in non-overlapping relation to each other; said auxiliary wing members having an upper curved surface and having their lower surfaces formed of two planes intersecting each other at an obtuse angle.

5. In an aircraft having juxtaposed main wings, a plurality of auxiliary wing members projecting rigidly from the extremities of said main wings; said plurality of auxiliary wing members overlapping each other successively at their base portions, with the leading edge of each auxiliary wing member being disposed above and in suitably spaced relation to the trailing edge portion of the adjacent auxiliary wing member in advance thereof, and the free ends of said auxiliary wing members being in non-overlapping relation to each other; each of said auxiliary wing members having an upper curved surface, the radius of curvature of which increases towards the free ends of said auxiliary wing members.

6. In an aircraft having juxtaposed main wings, a plurality of auxiliary wing members secured to the extremities of each of said main wings and projecting therefrom, said auxiliary wing members being tapered towards their free ends, and having their base portions in overlapping relation to each other, with the leading edge of each auxiliary wing member overlapping the trailing edge of the adjacent auxiliary wing member and being in spaced relation thereto and the free ends of said auxiliary wing members being in non-overlapping relation to each other; each of said auxiliary wing members having an upper curved surface, the radius of curvature of which increases towards the free ends of said auxiliary wing members.

7. In an aircraft having juxtaposed main wings, a plurality of auxiliary wing members projecting rigidly from the extremities of said main wings; said plurality of auxiliary wing members overlapping each other successively at their base portions, with the leading edge of each auxiliary wing member being disposed above and in suitably spaced relation to the trailing edge portion of the adjacent auxiliary wing member in advance thereof, and the free ends of said auxiliary wing members being in non-overlapping relation to each other; each of said auxiliary wing members having the lower faces thereof formed of two plane surfaces intersecting each other at an obtuse angle which increases towards the free ends of said auxiliary wing members.

8. In an aircraft having juxtaposed main wings, a plurality of auxiliary wing members secured to the extremities of each of said main wings and projecting therefrom, said auxiliary wing members being tapered towards their free ends, and having their base portions in overlapping relation to each other, with the leading edge of each auxiliary wing member overlapping the trailing edge of the adjacent auxiliary wing member and being in spaced relation thereto and the free ends of said auxiliary wing members being in non-overlapping relation to each other; each of said auxiliary wing members having the lower faces thereof formed of two plane surfaces intersecting each other at an obtuse angle which increases towards the free ends of said auxiliary wing members.

In testimony whereof I have hereunto set my hand and seal.

JACOB SPIEGEL.